US011925952B2

(12) United States Patent
Mather et al.

(10) Patent No.: US 11,925,952 B2
(45) **Date of Patent: *Mar. 12, 2024**

(54) POWDER SPRAY GUN COMPRISING A WEAR RESISTANT ELECTRODE SUPPORT

(71) Applicant: NORDSON CORPORATION, Westlake, OH (US)

(72) Inventors: Brian D. Mather, North Olmsted, OH (US); Dale R. Juhn, North Olmsted, OH (US)

(73) Assignee: Nordson Corporation, Westlake, OH (US)

( * ) Notice: Subject to any disclaimer, the term of this patent is extended or adjusted under 35 U.S.C. 154(b) by 401 days.

This patent is subject to a terminal disclaimer.

(21) Appl. No.: 16/183,626

(22) Filed: Nov. 7, 2018

(65) Prior Publication Data

US 2019/0076859 A1 Mar. 14, 2019

Related U.S. Application Data

(63) Continuation of application No. 14/390,151, filed as application No. PCT/US2013/029086 on Mar. 5, 2013, now Pat. No. 10,150,123.

(Continued)

(51) Int. Cl.

*B05B 5/025* (2006.01)
*B05B 5/03* (2006.01)

(Continued)

(52) U.S. Cl.

CPC .............. *B05B 5/025* (2013.01); *B05B 5/032* (2013.01); *B05B 5/0533* (2013.01); *B05B 15/18* (2018.02); *B05B 7/025* (2013.01)

(58) Field of Classification Search

CPC ......... B05B 5/025; B05B 15/18; B05B 5/032; B05B 5/0533; B05B 7/025

See application file for complete search history.

(56) References Cited

U.S. PATENT DOCUMENTS

| | | | |
|---|---|---|---|
| 99,018 | A | 1/1870 | Smith |
| 3,131,867 | A | 5/1964 | Miller et al. |

(Continued)

FOREIGN PATENT DOCUMENTS

| | | | |
|---|---|---|---|
| DE | 19838278 | A1 | 2/2000 |
| DE | 29924481 | U1 | 6/2003 |

(Continued)

OTHER PUBLICATIONS

Written Opinion dated Jun. 25, 2013 for International Application No. PCT/US2013/029086.

(Continued)

*Primary Examiner* — Steven M Cernoch

(74) *Attorney, Agent, or Firm* — BakerHostetler

(57) ABSTRACT

A spray nozzle assembly is provided with an electrode, a wear resistant member, and a compliant sleeve. The wear resistant member supports the electrode and is supported by the compliant sleeve. For coating operations that use abrasive powder such as porcelain enamel, the wear resistant member may comprise ceramic. The compliant sleeve may be made of an elastic material such as plastic, which allows one end of the compliant sleeve to receive an end of a glass powder tube. The wear resistant member may be in the form of a ceramic spider. The electrode may be installed in-line with a powder flow path defined by the powder tube, which extends through a spray gun body.

18 Claims, 5 Drawing Sheets

Related U.S. Application Data

(60) Provisional application No. 61/623,219, filed on Apr. 12, 2012.

(51) Int. Cl.

| | |
|---|---|
| ***B05B 5/053*** | (2006.01) |
| ***B05B 7/02*** | (2006.01) |
| ***B05B 15/18*** | (2018.01) |

(56) References Cited

U.S. PATENT DOCUMENTS

| | | | | |
|---|---|---|---|---|
| D226,523 | S | 3/1973 | Thornton et al. | |
| 3,793,049 | A * | 2/1974 | Probst | B05B 5/032 427/475 |
| D234,847 | S | 4/1975 | Hoffman | |
| D258,526 | S | 3/1981 | Nederman | |
| D267,506 | S | 1/1983 | Evans | |
| 4,530,467 | A | 7/1985 | Bueno | |
| 4,788,933 | A | 12/1988 | Buschor | |
| 4,802,625 | A | 2/1989 | Buschor | |
| 4,848,672 | A | 7/1989 | Matsumoto et al. | |
| D310,556 | S | 9/1990 | Russell | |
| D311,573 | S | 10/1990 | Lewis | |
| 5,344,082 | A | 9/1994 | Haller et al. | |
| 5,368,237 | A | 11/1994 | Fulkerson | |
| D364,449 | S | 11/1995 | Ellenberger | |
| 5,853,126 | A | 12/1998 | Alexander | |
| D407,802 | S | 4/1999 | Hatfield et al. | |
| D428,805 | S | 8/2000 | Sato et al. | |
| D452,299 | S | 12/2001 | Aldred et al. | |
| 6,328,224 | B1 | 12/2001 | Alexander | |
| 6,478,242 | B1 | 11/2002 | Knobbe et al. | |
| 6,562,138 | B1 | 5/2003 | Haas | |
| D480,454 | S | 10/2003 | Filer | |
| 6,676,029 | B2 | 1/2004 | Mitchell | |
| 6,796,519 | B1 | 9/2004 | Knobbe et al. | |
| 7,128,277 | B2 | 10/2006 | Schaupp | |
| D546,665 | S | 7/2007 | Medlin | |
| D546,865 | S | 7/2007 | Rietveld et al. | |
| 7,367,518 | B2 | 5/2008 | Tanigaki et al. | |
| D591,407 | S | 4/2009 | Youssef et al. | |
| 7,617,998 | B2 | 11/2009 | Mauchle et al. | |
| D631,542 | S | 1/2011 | Degross et al. | |
| 7,992,515 | B2 | 8/2011 | Von et al. | |
| D676,943 | S | 2/2013 | Kluss et al. | |
| 10,150,123 | B2 * | 12/2018 | Mather | B05B 5/032 |
| 2005/0173556 | A1 * | 8/2005 | Kwok | B05B 7/1486 239/79 |
| 2007/0063077 | A1 | 3/2007 | Keudell et al. | |
| 2008/0191067 | A1 | 8/2008 | Mauchle et al. | |
| 2012/0234233 | A1 * | 9/2012 | Baumann | B05B 9/03 118/300 |

FOREIGN PATENT DOCUMENTS

| | | | |
|---|---|---|---|
| DE | 102004055106 | A1 | 5/2006 |
| EP | 0236794 | A2 | 9/1987 |
| EP | 0383030 | A1 | 8/1990 |
| EP | 0599498 | A1 | 6/1994 |
| EP | 0756898 | A1 | 2/1997 |
| EP | 1084759 | A2 | 3/2001 |
| EP | 1614479 | A1 | 1/2006 |
| EP | 1752224 | A2 | 2/2007 |
| JP | 62-269766 | A | 11/1987 |
| JP | 02-241562 | A | 9/1990 |
| JP | 06-210199 | A | 8/1994 |
| JP | 2001-129441 | A | 5/2001 |
| JP | 2002-523212 | A | 7/2002 |
| JP | 2007-121272 | A | 5/2007 |
| JP | 2008-536677 | A | 9/2008 |

OTHER PUBLICATIONS

International Search Report dated Jun. 25, 2013 for International Application No. PCT/US2013/029086.

English Translation of JP Office Action dated Oct. 12, 2017 for JP Application No. 2015505716.

Notice of opposition against European Patent No. 2836308; dated Apr. 17, 2020 for EP Application No. 13715784.

* cited by examiner

POWDER SPRAY GUN COMPRISING A WEAR RESISTANT ELECTRODE SUPPORT

RELATED APPLICATION

This application is a continuation of U.S. patent application Ser. No. 14/390,151, filed Oct. 2, 2014, and published as U.S. Patent App. Pub. No. 2015/0115073 on Apr. 30, 2015, which is a national phase entry of International Patent App. No. PCT/US2013/029086, filed Mar. 5, 2013, which claims the benefit of U.S. Provisional Patent App. No. 61/623,219, filed Apr. 12, 2012, the entire disclosures of which are fully incorporated herein by reference.

TECHNICAL FIELD OF THE DISCLOSURE

The disclosure relates generally to material application devices used for spraying powder coating material onto a work piece or object. More particularly, the disclosure relates to material application devices for spraying porcelain enamel or other abrasive powder coating material.

BACKGROUND OF THE DISCLOSURE

A material application device is used to apply powder coating material to an object, part or other work piece or surface. A material application device is also referred to herein as a spray gun. Spray guns are often used to apply organic powder coating material. It is also known to apply porcelain enamel powder coatings to work pieces. Porcelain enamel coating material is a fine glass powder-like material, but is unlike organic powder coating material made from plastics and polymers. Organic powder may be characterized by lower melting temperatures as compared to porcelain enamel powder, and organic powders tend to be lighter, often exhibit impact fusion and have a fairly high transfer ratio or efficiency (transfer ratio or efficiency refers to the percentage of powder coating material that adheres to the work piece during a coating or spraying operation). Organic powder can have higher transfer ratios, along the order of seventy to eighty percent, because polymer and plastic materials are receptive to electrostatic charge applied to the powder by the spray gun. Porcelain enamel coating materials are difficult to apply an electrostatic charge, thereby exhibiting lower transfer ratios along the order of twenty percent, tend to be heavier than organic powder coating materials, and are highly abrasive because they comprise fine glass particles.

SUMMARY OF THE DISCLOSURE

In one embodiment disclosed herein, a spray gun comprises a nozzle assembly that may be used with abrasive powder coating material, for example, porcelain enamel. In a more particular embodiment, the nozzle assembly comprises an electrode that is disposed in-line within a powder flow path of the spray nozzle. The powder flow path, in one embodiment, extends from an inlet end of the spray nozzle to an outlet end of the spray nozzle, and powder coating material enters the inlet end along an axis. The electrode may be supported with a ceramic member, with the ceramic member being in-line with the axis. In another embodiment, the powder flow path extends from a back end of the spray gun through to the nozzle end of the spray gun along the same axis.

In another embodiment, a spray nozzle assembly comprises a wear resistant electrode support member that is supported in the spray nozzle by a compliant member. In a more particular embodiment, the compliant member comprises an elastically compliant material. In another embodiment, a spray nozzle assembly for a spray gun comprises a nozzle body, a wear resistant member that supports an electrode, and a compliant member that supports the wear resistant member in the nozzle body. In a more particular embodiment, the wear resistant member comprises ceramic material and the compliant member comprises an elastic material, for example plastic. The spray nozzle may be used, for example, with a spray gun that applies an abrasive powder coating material, for example, glass powder coating material.

In another embodiment disclosed herein, a nozzle assembly comprises a nozzle body, an electrode and a compliant member or sleeve. In a more particular embodiment, a ceramic member supports the electrode so that an electrode tip is disposed within the nozzle body, with the compliant member supporting the ceramic member.

In another embodiment disclosed herein, an electrode assembly comprises an annular member or sleeve having an open first end and an open second end with the annular member comprising compliant material, for example plastic, an electrode and a ceramic body that retains the electrode. In a particular embodiment, the ceramic member is supported in the annular member. In another embodiment, the open first end may be adapted to seal an end portion of a glass tube.

In another embodiment disclosed herein, a wear sleeve comprises an annular body comprising compliant material, the annular body comprising an open first end and an open second end, the open first end being adapted to support or seal one end of a glass tube, the second open end being adapted to receive an electrode support member.

In another embodiment, a spray gun for spraying porcelain enamel powder coating material comprises a housing comprising a powder inlet end and a powder outlet end, a spray nozzle assembly, and a glass powder tube that extends along an axis from said powder inlet end to the spray nozzle assembly. In a more specific embodiment, the spray nozzle assembly comprises a spray nozzle, a sleeve and an electrode support assembly, the electrode support assembly comprising an electrode that is disposed in the sleeve and in line with the axis. In still a more specific embodiment, the sleeve comprises elastically compliant material and the electrode is supported by a ceramic member that is disposed in the sleeve.

The various inventions may be used with a spray gun for spraying abrasive materials, for example, porcelain enamel powder. However, various inventive aspects disclosed herein may alternatively be used for spraying organic powder or other non-porcelain enamel materials. Moreover, the various inventions may be used with automatic spray guns or alternatively manual spray guns. The various inventions may also be used with spray guns that have different mounting configurations, including but not limited to bar mount and tube mount configurations.

These and other aspects and advantages of the present invention will be appreciated and understood by those skilled in the art from the following detailed description of the exemplary embodiments in view of the accompanying drawings.

DETAILED DESCRIPTION OF EXEMPLARY EMBODIMENTS

Figure 1:
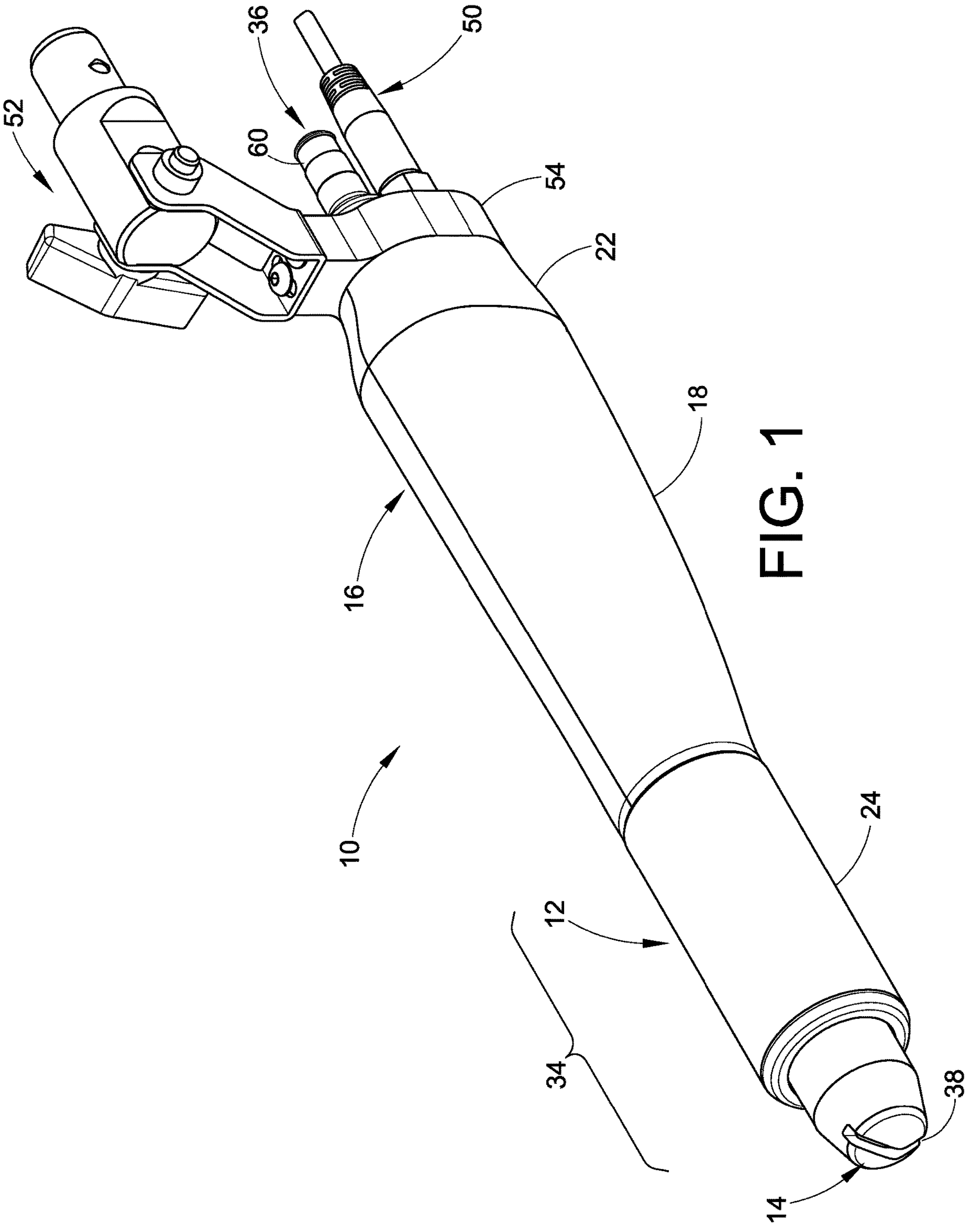
FIG. 1 is an isometric of an exemplary spray gun in a bar mount configuration that incorporates one or more of the inventions.

Although the exemplary embodiments are described in terms of a spray gun for spraying porcelain enamel powder coating materials, the inventions are not limited to such material, and will find application in other spray coating systems using powders that may be organic or glass or other compositions. While the exemplary embodiment of a spray gun is illustrated herein as an automatic gun, and more particularly an automatic spray gun in a bar mount configuration, those skilled in the art will readily understand and appreciate that the inventions may also be conveniently used with manual spray guns, as well as automatic guns with other mounting or support configurations, including but not limited to tube mount. The inventions described herein relate to components associated at the spray end or outlet of the spray gun, such as the spray nozzle, an electrode assembly and so on. Therefore, the inventions may readily be adapted to other spray gun configurations without departing from the teachings and scope of the present inventions. The exemplary embodiments utilize ceramic as a wear resistant material for some parts that are exposed to flow of an abrasive powder coating material. But those skilled in the art will readily understand that ceramic is only one example of a wear resistant material that may be used for such parts. Other wear resistant materials may be used as needed, for example, borosilicate glass such as PYREX™ and hardened steels, such as steel having a Rockwell C hardness in the upper sixties or more.

While various aspects and features and concepts of the inventions are described and illustrated herein as embodied in various combinations in the exemplary embodiments, these various aspects, features and concepts may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices and so on may be described herein, such descriptions are not intended to be a complete or exhaustive list of available alternative embodiments, whether presently known or later developed. Those skilled in the art may readily adopt one or more of the aspects, concepts or features of the various inventions into additional embodiments within the scope of the present inventions, even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present inventions however, such values and ranges are not to be construed in a limiting sense and are intended to be critical values or ranges only if so expressly stated. Additionally, even though some features and aspects and combinations thereof may be described or illustrated herein as having a specific form, fit, function, arrangement or method, such description is not intended to suggest that such descriptions or illustrated arrangements are required or necessary unless so expressly stated. Those skilled in the art will readily appreciate additional and alternative form, function, arrangement or methods that are either known or later developed as substitute or alternatives for the embodiments and inventions described herein.

By way of introduction, this disclosure presents a number of inventions and inventive concepts as embodied in the examples illustrated in the drawings and explained in the specification. One such concept is the use of a powder flow path that directs powder flow along an axis into a spray nozzle assembly, and an electrode assembly is provided that positions an electrode tip within an interior flow volume or path of the spray nozzle body. In one embodiment, the electrode assembly is preferably in-line with the powder flow axis into the spray nozzle assembly. The in-line configuration of the electrode assembly reduces direct impact of abrasive powder coating material on interior surfaces of the spray nozzle assembly. The in-line configuration of the electrode assembly facilitates use of a compliant member or sleeve that is made of an elastically compliant material, to position and support the electrode assembly at a desired location. Additional embodiments of this concept are presented herein.

In other embodiments of the concept for an in-line configuration of the electrode assembly, a powder flow path may optionally extend along a single powder flow axis from an inlet end of a spray gun body into a spray nozzle at an outlet end of the spray gun body wherein the spray nozzle has a powder flow axis into the spray nozzle and an electrode assembly that is in-line with the powder flow axis into the spray nozzle. In a more preferred embodiment, the powder flow axis into the spray nozzle is collinear with the powder flow axis through the spray gun body. This same axis powder flow path through the spray gun body and into the spray nozzle reduces dead zones within the spray nozzle to facilitate purge and cleaning operations for the spray gun. Additional embodiments of this concept are presented herein.

Another inventive concept is a support structure for an electrode. In one embodiment, a wear resistant electrode support member is disposed and supported within a compliant sleeve. The compliant sleeve provides a cushioned support for the wear resistant member. Additional embodiments of this concept are presented herein.

Another inventive concept is the provision of a sleeve that is made of compliant material and supports an electrode assembly. An example of a compliant material is an elastic material such as polyurethane, but many other plastic and polymer based elastic materials may be used as a compliant material for the sleeve. The compliant sleeve provides a cushioned holder for the electrode assembly, and also optionally provides a compliant and cushioned connection for a glass powder tube end. Additional embodiments of this concept are presented herein.

Another concept is embodied in a spray nozzle assembly that incorporates a compliant member, such as a sleeve, for example, and a wear resistant electrode support member. The spray nozzle may include a nozzle body also made of ceramic or other wear resistant material. Additional embodiments of this concept are presented herein.

Figure 1A:
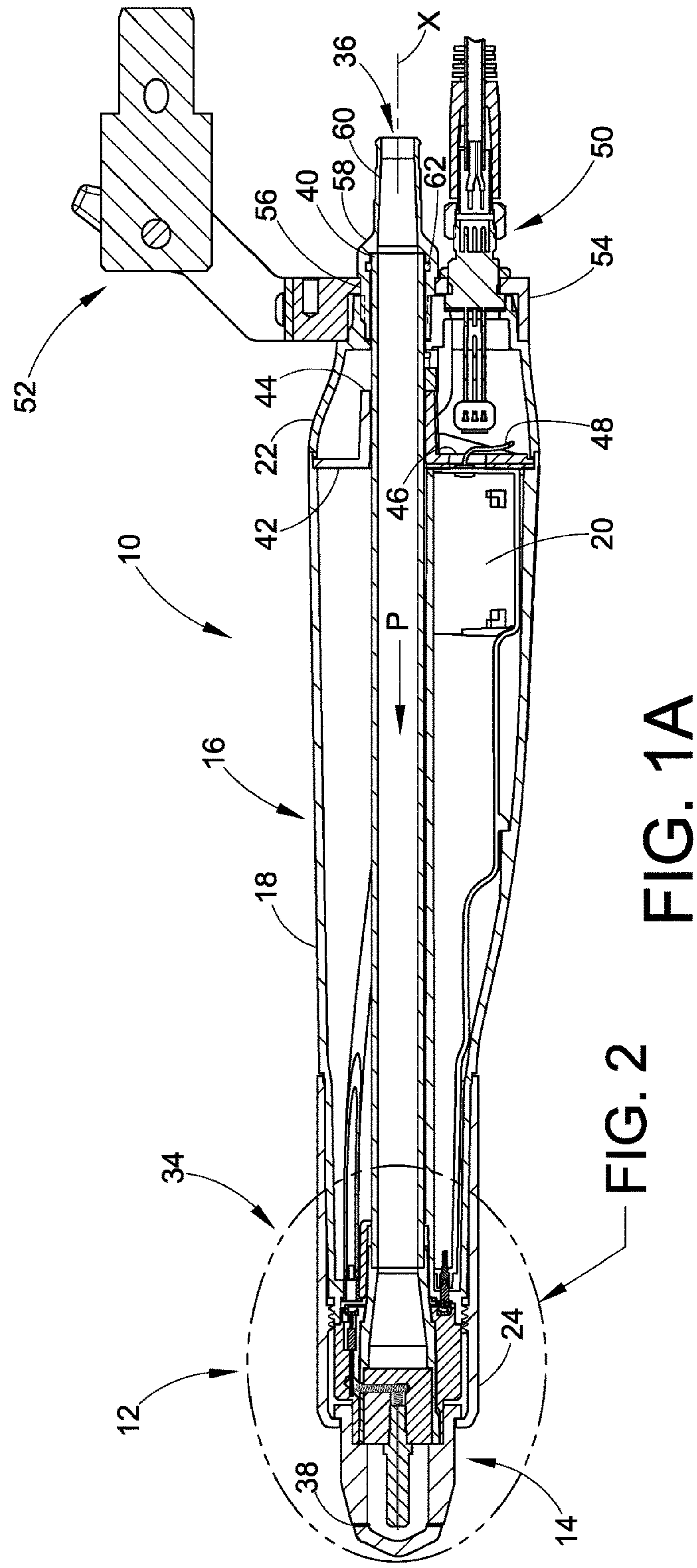
FIG. 1A is an elevation of the spray gun of FIG. 1, in longitudinal cross-section.
Figure 2:
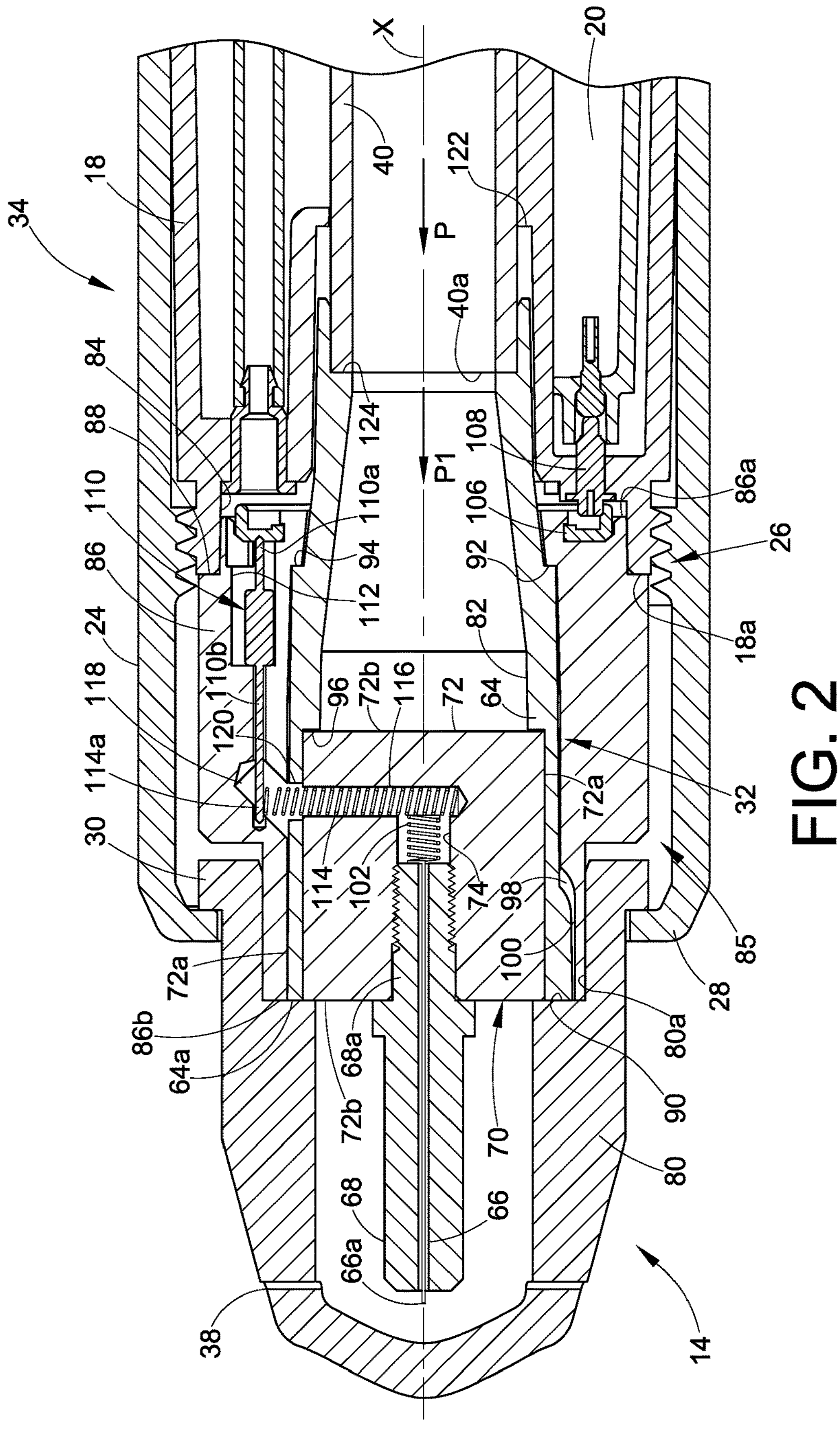
FIG. 2 is an enlarged view of the circled region of FIG. 1A.

With reference to FIGS. 1 and 1A and 2, an embodiment of a spray gun 10 is illustrated. The spray gun 10 may be used for spraying powder coating material on objects or workpieces, and even though many different powder materials may be used, various features of the spray gun 10 are particularly well suited for spraying abrasive powders such as, for example, porcelain enamel powder. Generally, the spray gun 10 shares many common design aspects with a commercially available Encore® model spray gun available from Nordson Corporation, Westlake, Ohio. Therefore, many of the details of the spray gun 10 and the operations and design of the components are well known and do not need to be described to understand and practice the present inventions. The present inventions primarily relate to the forward end 12 of the spray gun 10, in particular the spray nozzle 14 and related components. The commercially available Encore® model spray gun was originally designed for spraying organic powder coating materials. Those skilled in the art will therefore readily appreciate that within the scope of the present disclosure is the ability to configure an Encore® model gun for spraying organic powders and also, with a few component substitutions, to configure the spray gun to spray abrasive powders such as porcelain enamel powder. Although the embodiments herein utilize much of the design of the Encore® model spray gun, such is not required, and the inventions may be used with many other spray gun designs as needed.

The spray gun 10 includes a housing 16 which may be provided as multiple sections held together such as by using threaded connections and compression joints. The housing 16 thus may include a front gun body 18 that houses and supports a high voltage source such as a multiplier 20. The multiplier 20 generates a high voltage in order to apply electrostatic charge to the powder coating material as is well known. The housing 16 may further include a rear gun body 22 that is attached to the front gun body 18 by any convenient means such as screws (not shown) for example. The housing 16 may further include the spray nozzle 14 and a nozzle nut 24. The nozzle nut 24 has a threaded connection 26 (FIG. 2) onto a threaded forward end of the front gun body 18, and the nozzle nut 24 also includes a forward lip 28 that engages a flange 30 on the spray nozzle 14.

Figures 3, 3A:
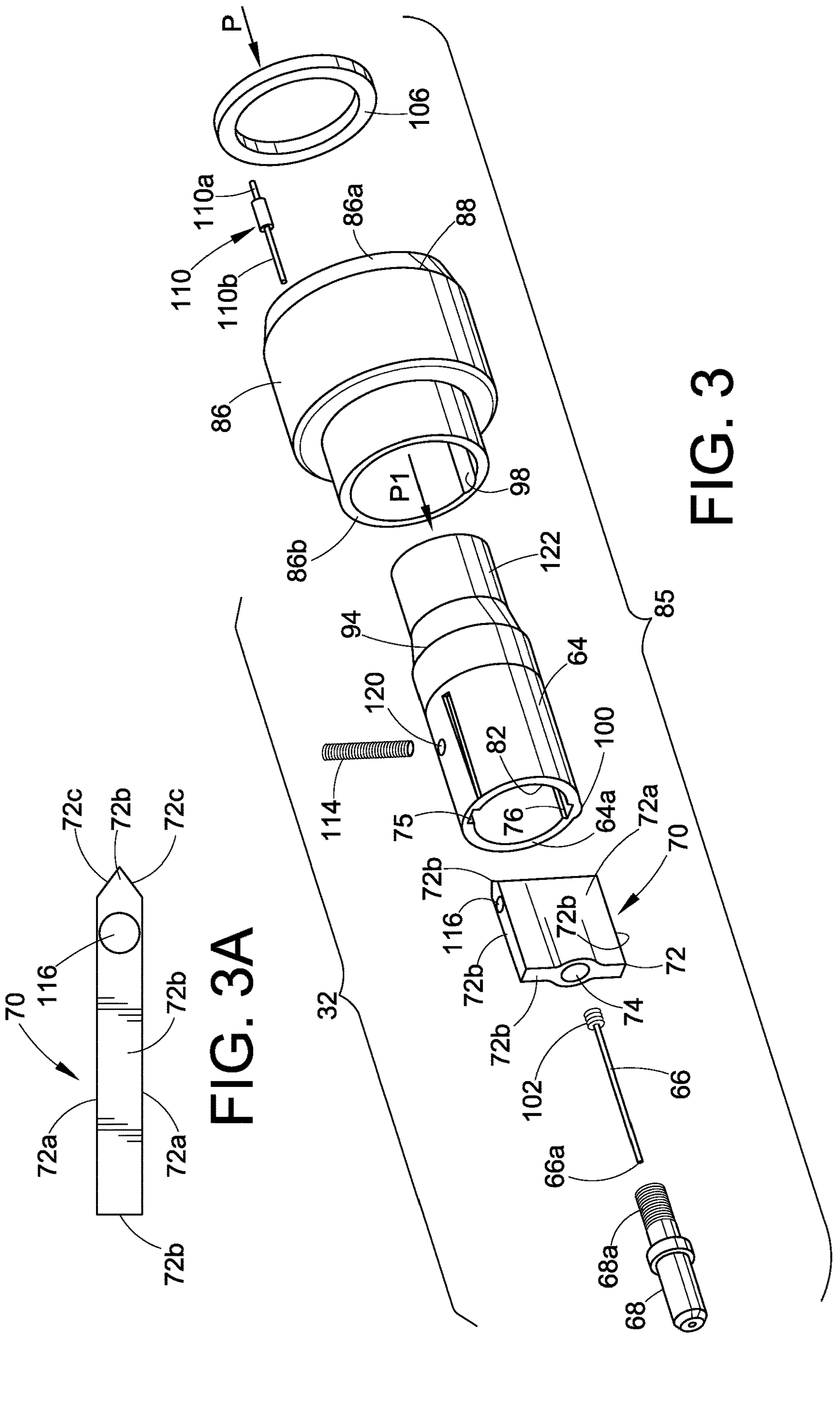
FIG. 3 is an exploded view of an electrode support assembly shown in FIG. 2.
FIG. 3A is a top plan view of a wear resistant member.

When the nozzle nut 24 is tightened onto the front gun body 18, the spray nozzle 14 is pulled up tight against an electrode assembly 32 (FIG. 3). The electrode assembly 32 may be considered as being part of a front end assembly 34 (FIG. 1) that we also refer to herein as a spray nozzle assembly 34 for the spray gun 10. The electrode assembly 32 provides part of a powder flow path P that extends from a powder inlet end 36 at the back end of the spray gun 10 to a spray orifice or outlet 38 that is formed in the spray nozzle 14. The spray orifice or outlet 38 may be realized in the form of a slot, opening or other geometry that produces a desired spray pattern from the spray nozzle assembly 34. In the exemplary embodiment, the powder flow path P may be centered along a longitudinal axis X of the spray gun 10, and is a straight line flow path within a powder tube 40 and through the gun body 18, 22 and into the spray nozzle assembly 34, although straight line powder flow from the powder inlet end 36 to the spray orifice 38 is not required. This flow path P allows for a smooth wall assembly that minimizes or can eliminate entrapment areas in the powder flow path, thus facilitating fast color change and purging operations. The electrode assembly 32 provides a forward portion P1 (FIG. 2) of the powder flow path P as further described below. Alternatively, the P1 path need not be collinear with the flow path P that is upstream of the electrode assembly 32. The longitudinal axis X may be the center longitudinal axis of the powder tube 40.

In contrast with the Encore® model spray gun that is configured for organic powder, the spray gun 10 embodiment differs in the design of the front end assembly 34 in order to accommodate an abrasive powder coating material. In addition, the spray gun 10 uses a glass powder tube 40, for example made of PYREX®, as is well known in the art of spraying abrasive powder coating materials like porcelain enamel. Alternatively, the powder tube 40 may comprise an abrasion resistant material other than glass as needed. The balance of parts of the spray gun 10 may be but need not be the same as the Encore® model spray gun.

A bulkhead 42 is attached by screws (not shown), compression fit or other convenient means to the back end of the front gun body 18 so as to cover the rearward open end of the front gun body 18, thereby also enclosing the multiplier 20. The bulkhead 42 includes a powder tube opening 44 which allows the powder tube 40 to be pushed through the front gun body 18 to the front end assembly 34. The bulkhead 42 also provides a cable opening 46 through which electrical wires 48 can pass to the multiplier 20 so as to provide input power to the multiplier 20 from an electrical connector 50 that is connectable to a power source (not shown).

A spray gun bar mount assembly 52 may be installed on the rear gun body 22. The bar mount assembly 52 is used to releasably support the spray gun 10 on a bar or other support that is used to position the spray gun 10 for a coating operation, usually performed in a spray booth, as is well known. The bar mount assembly 52 may include a bar mount adapter 54 that attaches to the rear gun body 22. The bar mount adapter 54 may comprise metal and provides an electrical ground for the multiplier 20. Although the exemplary embodiment illustrates a bar mount configuration for the spray gun, the inventions may also be used with tube mount configurations in which the housing typically is longer than the bar mount configuration, with the spray gun installed on a gun mover such as an oscillator, reciprocator, and so on as is well known.

The glass powder tube 40, when fully inserted into the spray gun 10, extends out the back of the spray gun 10 through an opening 56 in the bar mount adapter 54. A powder supply hose connector 58 may be installed in an opening 56 in the bar mount adapter 54. The powder supply hose connector 58 provides a nipple 60 which receives a powder supply hose (not shown) that is connectable to a supply (not shown) of powder coating material. A seal 62, for example a common o-ring seal, may be used to provide a seal and soft interface between the glass powder tube 40 and the hose connector 58.

Figure 4:
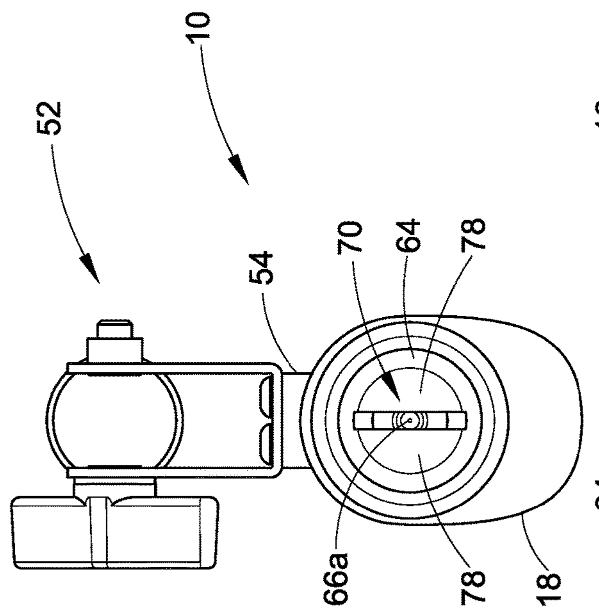
FIG. 4 is a front end elevation of the spray gun of FIG. 1.

With reference to FIGS. 2, 3 and 4, the front end assembly 34 provides structure for supporting the electrode assembly 32 and providing a forward portion P1 of the powder flow path P. The forward portion P1 of the powder flow path extends from the outlet end 40*a* of the powder tube 40 through the spray orifice 38. This forward portion P1 of the powder flow path is defined in part by an interior volume of an annular sleeve 64. In the exemplary embodiment, the annular sleeve 64 may be realized in the form of a compliant sleeve 64. Because the compliant sleeve 64 comprises a compliant elastic material, for example plastic, the compliant sleeve 64 will tend to abrade and wear due to exposure to the powder coating material, particularly abrasive powder coating material such as glass powder. We therefore can consider the compliant sleeve to be a "wear sleeve" or wear component. By "wear sleeve" then is meant herein that as the annular sleeve becomes exposed to the abrasive powder during coating operations, over time the sleeve 64 will become worn and need to be replaced. But there are benefits from use of a wear sleeve that make the use of a readily replaceable item beneficial, as will be apparent from further discussion hereinbelow.

The electrode assembly 32 includes in part an electrode 66 that may be supported by an electrode holder 68. The electrode holder 68 may be securely installed in a wear resistant electrode support member 70 so that an electrode discharge tip 66*a* is disposed in an appropriate position with respect to the powder flow through the spray nozzle assembly 34 in order to apply an electrostatic charge to the powder that flows through the spray nozzle 14. The electrode holder 68 may be made of any suitable material such as nylon. In the exemplary embodiments, the electrode discharge tip 66*a* may be disposed within the interior volume of the spray nozzle 14, preferably near the spray orifice 38. However, the electrode discharge tip 66*a* may be positioned elsewhere as needed for a particular spray gun. It is further preferred that the electrode 66 be positioned in-line with the powder flow path P1 of the powder as the powder leaves the powder tube 40 and passes into the electrode assembly 32 and the spray nozzle 14. It is preferred but not required that the electrode 66 be centered on the X axis which may also be the center axis of the powder tube 40 and the powder flow path P, P1. This in-line orientation is made available by the use of the annular sleeve 64 that supports the electrode holder 68 in-line with the directional flow path P1 of the powder flow. This allows a powder flow path P1 from the powder tube outlet end 40*a*, through the electrode assembly 32 and through the spray nozzle 14 and the spray orifice 38 along a single directional axis, which directional axis in this exemplary embodiment preferably is collinear with the longitudinal axis X of the powder tube 40 along which the powder flows end to end through the spray gun 10.

Figure 5:
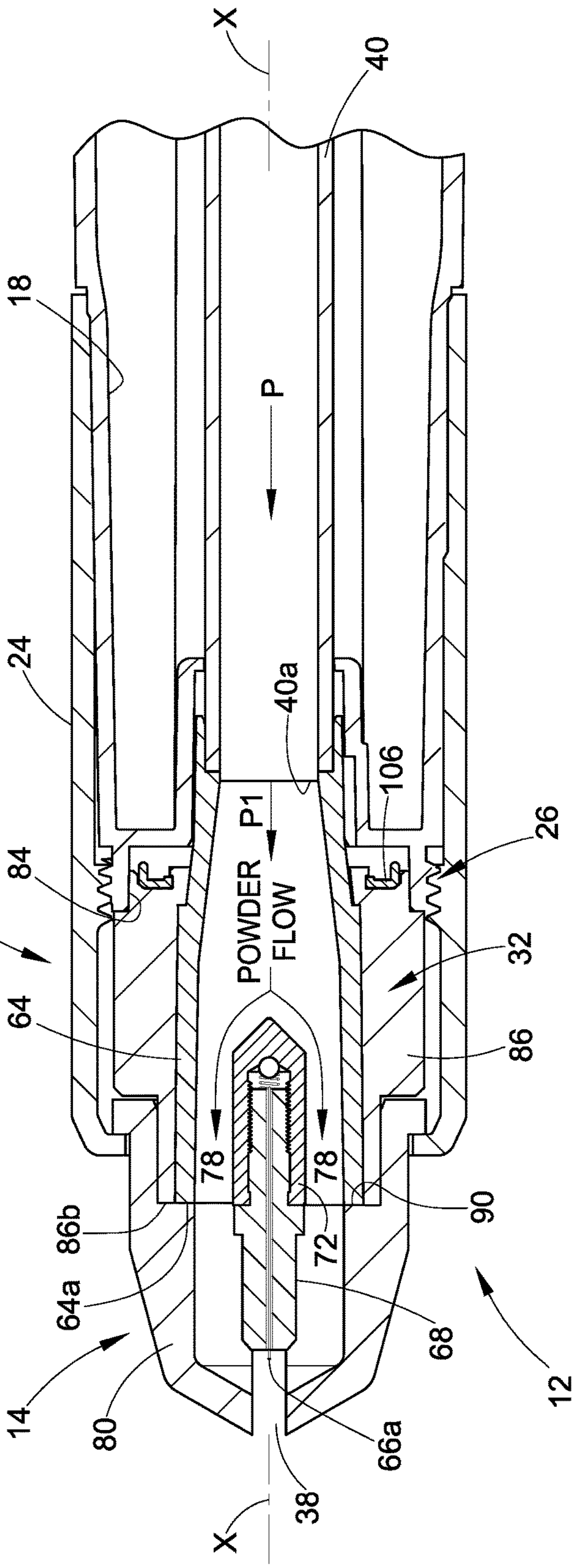
FIG. 5 is the section view of FIG. 2 rotated 90° about the X axis.

With particular reference to FIGS. 2, 3, 3A and 4, the in-line electrode orientation exposes the wear resistant member 70 to the abrasive powder flow. In one embodiment, the wear resistant member 70 is provided in the form of a thin, six sided plate-like body 72, which may also be referred to in the art as a spider 72. The term spider in the art commonly refers to a structure that is disposed in a tubular member and that supports an electrode in a powder flow path through the tubular member, but presents a reduced obstruction to the powder flow by supporting the electrode holder with legs or extensions out to the surrounding wall of the tubular member. The spider 72 includes a first blind bore 74 (FIG. 2) that is threaded and receives a threaded portion 68*a* of the electrode holder 68. The spider 72 includes two major sides 72*a* and four minor sides 72*b*, of which only two minor sides 72*c* contact powder directly. The minor sides 72*b* need only provide sufficient width to the spider 72 to accommodate and secure the diameter of the electrode holder threaded portion 68*a*. The major sides 72*a* are sized so as to be slideably received in respective slots 75, 76 (FIG. 3) formed in the annular sleeve 64. The backward or upstream facing minor side 72*b* will be exposed to the most direct impact from the abrasive powder and, therefore, may have tapered sides 72*c* to reduce direct impact wear. By supporting the spider 72 with the major sides 72*a* parallel to the general powder flow path direction P1, most of the surface area of the spider 72 will not be exposed to direct impact by the powder. We refer to the "general" powder flow path direction because within the spray nozzle 80 and the wear sleeve 64 the powder flow is not simply along a single directional axis, but does move through the spray nozzle assembly 34 from an entrance end (124) to the spray outlet orifice 38 in a generally consistent direction centered about the axis X. As best illustrated in FIG. 5, the thin spider 72 also allows for substantial space 78 within the sleeve 64 for the powder to flow through the annular sleeve 64 and around the spider 72.

The wear resistant member 70 preferably is made of ceramic material, as is the spray nozzle body 80, or at least the surfaces that are exposed to the abrasive powder flow are made of a wear resistant or ceramic material. Other wear resistant materials may be used, but for the art of spraying porcelain enamel powders, ceramic materials are commonly used.

The annular sleeve or wear sleeve 64 as noted above preferably is made of a compliant elastic material. We accomplish this by making the compliant sleeve 64 out of a plastic or other suitable compliant and preferably elastic material. Even though the wear sleeve 64 is exposed to the abrasive powder, much of the sleeve wall structure 82 (FIG. 3) is cylindrical and parallel with the powder flow path P1, thereby reducing direct impact of the abrasive powder against the interior surfaces of the compliant sleeve 64.

By having the compliant sleeve 64 that supports the electrode 66 made of an elastic material, we use less of the wear resistant material, such as ceramic, in the powder flow path, which is an expensive material compared to plastic, for the electrode assembly 32. The thin plate-like profile of the spider 72 also uses less ceramic material compared to the prior art which uses protective ceramic sleeves that surround the electrode. Although the wear sleeve may need replacement over time, the compliant wear sleeve is lower in cost as compared to a ceramic wear sleeve, is easily replaced and provides the cushioned mount for the expensive ceramic electrode support member and the glass powder tube.

The elastic material of the compliant sleeve 64 also provides a soft cushioned support for the ceramic spider 72. The elastic sleeve 64 can thus absorb shock and protect the more fragile ceramic spider 72 should impact occur such as dropping or knocking the spray gun, or other impacts to the electrode assembly 32.

The combination of the annular sleeve 64 made of compliant material and the wear resistant member 70 supported by the annular sleeve 64 thus provides a significant advance in the art by reducing the amount of ceramic needed for a spray nozzle assembly in a spray gun for abrasive powders. This combination benefits from the preferred but optional use of the in-line orientation of the electrode assembly 32 in the powder flow path P1 through the annular sleeve 64 because the annular sleeve 64 is not exposed to direct or facing impact from the abrasive powder but rather is exposed to an indirect contact with the powder. Although the wear sleeve 64 over time will need to be replaced, this replacement is quick and simple. By simply removing the nozzle nut 24 and the spray nozzle body 80, the operator has direct access to the compliant sleeve 64 which can easily be removed (as described below, the sleeve 64 is supported in the spray gun by a support sleeve which can also be removed for easier access to the wear sleeve 64.) The spider 72 may also be quickly slid out of the sleeve 64 when the sleeve 64 is being replaced.

With reference to FIGS. 2 and 3, a forward distal end portion 18*a* of the front gun body 18 includes a front recess or socket 84. An electrode support assembly 85 includes an electrode support sleeve 86 having a first end portion 86*a* that fits into the front recess 84 of the front gun body 18 such that a radial shoulder 88 abuts the distal end 18*a* of the front gun body 18. The compliant sleeve 64 is disposed inside the electrode support sleeve 86. The electrode support sleeve 86 includes an interior stop shoulder 92 that abuts an exterior radial shoulder 94 of the compliant sleeve 64, thus axially positioning the sleeve 64 inside the electrode support sleeve 86. As noted hereinabove, the wear resistant spider 72 is disposed inside the compliant sleeve 64 via the upper and lower slots 75, 76. The spider 72 is inserted into the compliant sleeve 64 until the tapered minor sides 72*c* bottom on a complementary profiled shoulder 96 inside the compliant sleeve 64. The electrode support sleeve 86 includes a second end portion 86*b* that fits into a counterbore 80*a* of the spray nozzle body 80 such that the distal end 86*b* of the electrode support sleeve 86 abuts an internal shoulder 90 formed by the counterbore 80*a*. The electrode support sleeve 86 may be provided with an alignment key slot 98 that receives a key tab 100 provided on the compliant sleeve 64. This assures that the compliant sleeve 64 is inserted into the electrode support sleeve 86 in the correct orientation so that electrical connection can be made to the electrode 66 as described below.

The length of the electrode support sleeve 86 and the length of the spider 72 may be selected such that when the nozzle nut 24 is tightened onto the front gun body 18, such as with the threaded connection 26, the internal shoulder 90 of the spray nozzle body 80 abuts the distal end 86*b* of the electrode support sleeve 86. This results in the nozzle nut 24 compressively loading the spray nozzle body 80 and the electrode support sleeve 86 against the forward end portion 18*a* of the front gun body 18. This securely joins the spray nozzle assembly 34, including the electrode assembly 32, to the front gun body 18.

The front end or spray nozzle assembly 34 thus comprises the electrode support assembly 85 and the spray nozzle body 80 and is secured to the spray gun body 18 with the nozzle nut 24. These are the basic parts, along with the glass powder tube 40, that are used in place of the spray nozzle and electrode related components of the Encore® model organic powder spray gun configuration. The electrode assembly 32 comprises the compliant sleeve 64, the electrode 66 and the spider 72. The electrode support assembly 85 comprises the electrode support sleeve 86, the compliant sleeve 64, the spider 72 and the electrode 66. We consider each of these assemblies to be inventive advances in the art, individually and collectively. From these assembly points of view, the electrode 66 is a basic element, although there may be additional components that are used to support the electrode and to connect the electrode to a power source as described below.

The electrode 66 is positioned in the spray nozzle assembly 34 such that preferably the electrode discharge tip 66*a* is disposed near the spray orifice 38 of the spray nozzle 14. Electrical energy is supplied to the electrode 66 from the multiplier 20. The electrode 66 may include a coiled end 102 at an end opposite the electrode discharge tip 66*a*. The electrode support sleeve 86 may include an annular electrically conductive electrode ring 106. A multiplier output contact pin 108 contacts the electrically conductive electrode ring 106. The electrically conductive electrode ring 106 contacts a first lead 110*a* of a current limiting resistor 110 that is supported in a first bore 112 in the electrode support sleeve 86. The resistor 110 has a second lead 110*b* that contacts an electrode contact spring 114. The electrode 66 is retained in the electrode holder 68 that has a threaded connection with the threaded first blind bore 74 or other suitable mechanical connection technique. The electrode contact spring 114 is disposed in a second blind bore 116 that extends through a portion of the spider 72 and intersects with the first blind bore 74. This allows the electrode coiled end 102 to make electrical contact with the electrode contact spring 114. In this manner, electrical energy from the multiplier 20 is conducted to the electrode tip 66*a* via the multiplier output pin 108, the conductive electrode ring 106, the resistor 110, the electrode contact spring 114 and the electrode coiled end 102, to charge the powder coating material electrostatically as it flows through the spray nozzle 14 and out the spray orifice 38.

The electrode support sleeve 86 includes a second bore 118 that intersects with a reduced diameter portion of the first bore 112. The electrode contact spring 114 extends up through the second blind bore 116 in the spider 72, and through a hole 120 in the compliant sleeve 64. The hole 120 aligns with the second bore 118 in the electrode support sleeve 86 so that the electrode contact spring 114 extends through the hole 120 and into the second bore 118. The second lead 110*b* of the resistor 110 extends into the second bore 118 so as to make contact with the electrode contact spring 114.

In an exemplary method of the electrode assembly 32 into the spray nozzle assembly 34. Prior to installing the electrode assembly 32, the conductive electrode ring 106, the resistor 110 and the electrode support sleeve 86 are installed at the front end of the spray gun. Next, the spider 72 is pressed into the compliant sleeve 64 until the tapered back end 72*c* seats in the complementary shoulder 96, which aligns the second blind bore 116 with the hole 120 in the compliant sleeve 64. The spring 114 is inserted down into the second blind bore 116 until it bottoms. Separately, the electrode 66 is installed into the electrode holder 68. In its relaxed state, the electrode contact spring 114 extends up out of the second blind bore 116 and the hole 120. The spring 114 can be axially compressed until an upper end 114*a* is at least flush with the upper (as viewed in FIG. 2) surface of the compliant sleeve 64. The compliant sleeve 64 is inserted into the electrode support sleeve 86 (with alignment of the key slot 98 and the key tab 100) so that the hole 120 is blocked initially by the interior wall of the electrode support sleeve 86 and the electrode contact spring 114 is trapped in the second blind bore 116. When the compliant sleeve 64 has been fully inserted into the electrode support sleeve 86 such that the exterior radial shoulder 94 of the compliant sleeve 64 abuts the interior stop shoulder 92 of the electrode support sleeve 86, the hole 120 aligns with the second bore 118 of the electrode support sleeve 86 and the electrode contact spring 114 axially relaxes so as to snap up into the second bore 118 to make contact with the second lead 110*b* of the previously installed resistor 110.

The compliant sleeve 64 may further include a rearward cylindrical open end 122 that snugly and compliantly fits over the outlet end 40*a* of the glass powder tube 40. The glass powder tube 40 can be inserted through the rear gun body 22 and pushed through the front gun body 18 until it seats in the open end 122 of the compliant sleeve 64. The compliant sleeve 64 may be provided with an internal shoulder 124 against which the glass tube end 40*a* seats when fully inserted. This shoulder 124 may be considered the entrance end of the spray nozzle assembly 34 as powder exits the glass powder tube 40. It is preferred although not required that the compliant sleeve 64 be elastically compliant so as to form a sealed interface with the glass powder tube 40.

It should be noted that the specific details of the exemplary embodiments are not exclusive or required ways to realize the present inventions. The components may be realized in alternative form, fit and function as needed for a particular application. By way of an example, the spider 72 and electrode holder 68 could be made as a unitary structure to support the electrode 66 within the wear sleeve 64. Many different electrical arrangements can be used to couple the electrical energy from the multiplier 20 to the electrode 66. And alternative structures can be used to hold the front end assembly 34 components together and with the front gun body 18. So, the exemplary embodiments are not to be construed as limited to the specific structures and arrangements illustrated and described herein.

As noted hereinabove, the compliant sleeve 64 preferably comprises elastic material such as a plastic. The plastic material may be any suitable polymer, for example, polyurethane. It is desirable for many applications that the compliant sleeve plastic material have the characteristic of being resilient so that the compliant sleeve 64 may be used to form optional sealed interfaces with the glass powder tube 40 and the spray nozzle body 80. However, many alternative techniques are available to provide these sealed interfaces, so that the compliant sleeve 64 does not necessarily need to be elastically compliant for all applications. Independently, it is also preferred but not required that the wear sleeve be elastic so as to provide a cushioned support for the spider 72, whether or not the wear sleeve 64 is used for sealing interfaces.

By elastic we mean that the plastic material has sufficient elasticity to allow the compliant sleeve 64 to be compliant or conform with the glass powder tube 40. For example, in the embodiment of FIG. 2, the compliant sleeve 64 inner end 122 can stretch out to allow the glass powder tube end 40*a* to be inserted and to form a sealed interface. Whether some degree of plastic deformation also occurs at this interface is not a major concern because over time the wear sleeve 64 is replaced. But the compliant nature of the sleeve 64 allows a sealed interface with the glass powder tube end 40*a* without using additional seals such as o-rings. Alternatively, a less elastic plastic material may be used for the wear sleeve 64 along with alternative methods to seal the interface with the glass powder tube end 40*a*, even without inserting the glass powder tube end 40*a* into a portion of the wear sleeve 64.

The use of plastic material for the compliant sleeve 64, and preferably an elastically compliant material, allows for a face seal type sealed interface between the sleeve 64 forward open end 64*a* and the spray nozzle body internal shoulder 90. The length of the sleeve 64 may be selected so that when the sleeve 64 is fully inserted into the electrode support sleeve 86, a small portion, perhaps a few millimeters, extends outside the second end portion 86*b* of the electrode support sleeve 86. When the nozzle nut 24 is tightened onto the front gun body 18, the internal shoulder 90 axially compresses against the open end 64*a* of the sleeve 64 to form a sealed interface. Alternatively, other seal arrangements may be used to form the sealed interface as are well known in the art. The compliant nature of the sleeve 64 thus may be optionally used for various purposes, alone or in various combinations, including but not limited to forming a sealed interface with the glass powder tube 40, forming a sealed interface with the spray nozzle body 80, and providing a cushioned support for the wear resistant member 70.

The inventions have been described with reference to the exemplary embodiments. Modifications and alterations will occur to others upon a reading and understanding of this specification and drawings. It is intended to include all such modifications and alterations insofar as they come within the scope of the appended claims or the equivalents thereof.

What is claimed is:

1. A nozzle assembly, comprising:

a nozzle body;

a compliant sleeve having a first slot and a second slot; and a wear resistant member configured to support an electrode such that a tip of said electrode is disposed within said nozzle body, said wear resistant member having two major sides and two minor sides, and said wear resistant member comprises a first material, wherein said compliant sleeve supports said wear resistant member by receiving said two major sides in each of said first slot and said second slot, and said compliant sleeve comprises a second material that is different than the first material;

wherein the first material of the wear resistant member comprises ceramic; and wherein the wear resistant member supports an electrode holder that is configured to support the electrode.

2. The nozzle assembly of claim 1, wherein:

said compliant sleeve has a first open end that is configured to seal an end of a glass tube; and the wear resistant member is configured with a bore to receive the electrode.

3. The nozzle assembly of claim 1, wherein:

said compliant sleeve has a second open end that forms a seal against a surface of said nozzle body; and the wear resistant member is configured with a bore to receive the electrode.

4. The nozzle assembly of claim 1, wherein said nozzle body comprises ceramic.

5. The nozzle assembly of claim 1, wherein:

the second material of said compliant sleeve comprises an elastic material; and the wear resistant member is configured with a bore to receive the electrode.

6. The nozzle assembly of claim 5, wherein the second material of said compliant sleeve comprises plastic.

7. The nozzle assembly of claim 5, wherein the second material of said compliant sleeve comprises polyurethane.

8. The nozzle assembly of claim 1, wherein the first material of the wear resistant member comprises ceramic, and the second material of the compliant sleeve comprises plastic.

9. The nozzle assembly of claim 1, further comprising an electrode contact spring disposed in a transverse bore of the wear resistant member.

10. An electrode assembly for a spray gun, the electrode assembly comprising:

an annular sleeve having an open first end and an open second end, wherein said annular sleeve comprises a compliant material, and the annular sleeve includes a first slot and a second slot;

an electrode;

a ceramic member that supports said electrode, wherein said ceramic member has two major sides and two minor sides, and said two major sides are supported in each of said first slot and said second slot of said annular sleeve; and a glass tube, and said open first end being adapted to form a seal with an end portion of said glass tube, wherein the ceramic member supports an electrode holder that is configured to support the electrode.

11. The electrode assembly of claim 10, wherein the ceramic member is configured with a bore to receive the electrode.

12. The electrode assembly of claim 10, further comprising an electrode contact spring disposed in a transverse bore of the ceramic member.

13. A nozzle assembly for supporting an electrode in a spray gun for spraying porcelain enamel coating material, the nozzle assembly comprising:

an annular body comprising elastic material, wherein said annular body comprises an open first end and an open second end, said open second end having a first slot and a second slot; and a wear resistant member configured to support said electrode, said wear resistant member having two major sides and two minor sides, and said wear resistant member comprising a material that is different from the elastic material, wherein said open first end being adapted to seal an end of a glass tube, and wherein said first slot and said second slot of said open second end receiving each of said two major sides of said wear resistant member;

wherein said annular body is elastically compliant; and wherein the wear resistant member supports an electrode holder that is configured to support the electrode.

14. The nozzle assembly of claim 13, wherein the wear resistant member comprises ceramic, and the annular body comprises plastic.

15. The nozzle assembly of claim 13, further comprising an electrode contact spring disposed in a transverse bore of the wear resistant member.

16. A nozzle assembly, comprising:

a nozzle body;

a compliant sleeve having a first slot and a second slot; and a wear resistant member configured to support an electrode such that a tip of said electrode is disposed within said nozzle body, said wear resistant member having two major sides and two minor sides, and said wear resistant member comprises a first material, wherein said compliant sleeve supports said wear resistant member by receiving said two major sides in each of said first slot and said second slot, and said compliant sleeve comprises a second material that is different than the first material; and wherein the compliant sleeve includes an internal shoulder to seat the wear resistant member.

17. A nozzle assembly for supporting an electrode in a spray gun for spraying porcelain enamel coating material, the nozzle assembly comprising:

an annular body comprising elastic material, wherein said annular body comprises an open first end and an open second end, said open second end having a first slot and a second slot; and a wear resistant member configured to support said electrode, said wear resistant member having two major sides and two minor sides, and said wear resistant member comprising a material that is different from the elastic material, wherein said open first end being adapted to seal an end of a glass tube;

wherein said first slot and said second slot of said open second end receiving each of said two major sides of said wear resistant member; and wherein the annular body includes an internal shoulder to seat the wear resistant member.

18. A nozzle assembly, comprising:

a nozzle body;

a compliant sleeve having a first slot and a second slot; and a wear resistant member configured to support an electrode such that a tip of said electrode is disposed within said nozzle body, said wear resistant member having two major sides and two minor sides, and said wear resistant member comprises a first material, wherein said compliant sleeve supports said wear resistant member by receiving said two major sides in each of said first slot and said second slot, said compliant sleeve includes an internal shoulder to seat said wear resistant member, and said compliant sleeve comprises a second material that is different than the first material.

* * * * *